UNITED STATES PATENT OFFICE.

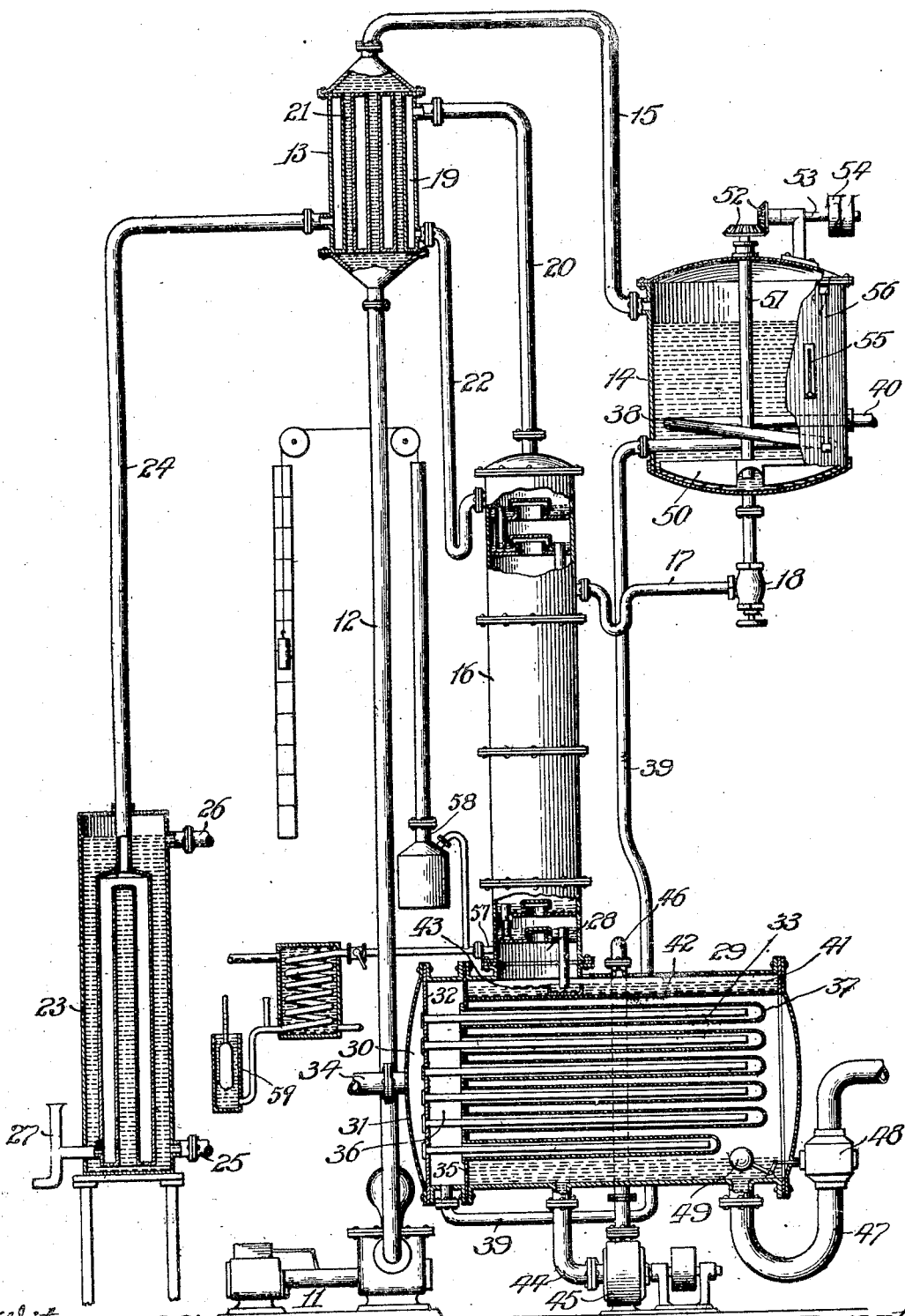

ADOLPH WOOLNER, JR., OF PEORIA, ILLINOIS.

DISTILLATION.

1,104,948.   Specification of Letters Patent.   Patented July 28, 1914.

Application filed November 3, 1910. Serial No. 590,571.

*To all whom it may concern:*

Be it known that I, ADOLPH WOOLNER, Jr., a citizen of the United States, residing at Peoria, in the county of Peoria and State of Illinois, have invented certain new and useful Improvements in Distillation, of which the following is a specification.

This invention relates to the art of distilling, its leading and principal objects being the distillation of spirits in such a manner that a spirit of improved flavor is economically obtained and the residue or slop of distillation is concentrated to a higher degree than has heretofore been customary or usual.

In order to obtain a full and complete understanding of the various advantages and benefits of this invention and its place in the industry of distillation it is necessary to briefly review the development of this art. Formerly the distillation of alcoholic liquors was carried on in so-called "pot stills" an apparatus in which the fermented wort or mash, the so-called "beer," was heated by the direct action of the fire. On account of the comparatively long heating and boiling of the beer by such apparatus and process highly flavored spirits were produced containing compounds agreeable both to taste and smell, and bringing about the distillation of higher alcohols and fatty acids essential or necessary to the production of a fine flavor. Obviously this method of distillation was both uneconomical and quite unhandy and was consequently gradually supplanted or displaced by steam distillation, the steam being delivered directly into the beer or fermented mash. At first this process of distillation was carried out by successive charges placed in the pot stills and later on the continuous beer still was developed, the same being a more economical construction and method. The earlier still operated by charges produced a better flavored product because the beer or mash was boiled during a longer time, but more steam was used, however, than was employed in the continuously operating still and obviously both produced a slop diluted by the condensed water derived from the steam.

My present invention provides a continuous distilling apparatus and method which permits a prolonged heating of the beer thereby assuring the production of highly flavored spirits as by the old pot still process, without reducing the steam economy of the continuous still referred to, and in my new apparatus and method the heating of the slop is done indirectly and a more concentrated slop is produced than in those stills in which the heating is done by direct steam. The distillation of the beer, fermented mash, or wort, without the introduction of the steam into the same is not new and there are various constructions of stills provided with a system of steam-heating pipes for the purpose of boiling the beer with the indirect steam, and also providing for mechanical agitation. It has been found, however, that when this indirect method or apparatus is used the heating surface becomes coated rather quickly with a thick crust of organic matter which adheres to the heating surface and prevents the economical transmission of heat therethrough, consequently making this method of indirect heating ineffective and unsatisfactory. My present invention avoids this difficulty by maintaining the slop continuously in rapid circulation by running the slop in a thin film over the heated surface, preferably with the aid of a circulating pump. Such a clean heating surface by the forced circulation of the slop as obtained by this invention is not only important because of the more efficient heat transmission, but it also avoids the detrimental influence which incrustation on the steam heated surface has on the quality of the distillate, because an over-heated burnt crust causes a burnt taste and smell in such distillate.

In order that those skilled in the art may have a thorough understanding of this improved process and novel apparatus, I have illustrated in the accompanying drawing an embodiment of the invention capable of carrying out the improved method of distilling. In this drawing the view illustrates the parts of the apparatus partially in elevation and partially in section.

A suitable pump 11 is connected by a pipe 12 to a beer heater 13, the latter in turn being connected to a reservoir 14, of substantial capacity, by a pipe 15, the lower end of such reservoir being in communication with a still or distilling column 16, of any suitable and desirable type, by a pipe 17, supplied with a controlling valve 18. The top end of this still 16 is in communication with the vapor compartment or chamber 19 of the beer heater 13 by a pipe 20, it being understood that this vapor compartment has extended therethrough a plurality of passages 21, through which the fermented wort or beer is forced. The lower end of this vapor compartment or chamber 19, is connected by a pipe 22 with the top portion of the still as indicated, and at a point higher up the compartment 19 is connected to a condenser 23 by a pipe 24, such condenser having the condensing water inlet and outlet pipes 25 and 26 respectively. Such condenser being also supplied with a discharge pipe 27 for the high wines or alcoholic liquors.

In the lower portion of the still 16 there is a steam chamber 28 and below the still and in communication therewith, I employ a steam-heated slop boiler or condenser having an outer shell 29, a steam chamber 30 at one end between an end wall 31 and an apertured header 32 having secured in its holes a plurality of comparatively long steam pipes 33 open at their remote ends, steam being admitted to the compartment 30 through an inlet pipe 34. Between the header 32 and another header 35 is an exhaust chamber 36 in communication with the various pipes 37 surrounding and spaced away from the pipes 33, and closed at one end and in communication at the other end with the chamber 36. A heating coil 38 in the reservoir or receptacle 14, is connected to this exhaust chamber 36 by a pipe 39, the coil 38 in turn having a discharge 40. The upper portion of the slop boiler or concentrator has a distribution chamber 41, the lower wall of which is disposed above the steam pipes 33, 37, and is composed of a perforated partition or distributing plate 42. The slop free, or substantially free from alcohol, is delivered from the still 16 into a cup or pan 43 from which it over-flows onto the perforated or apertured plate 42.

The lower portion of the concentrator is connected by a pipe 44 to a pump 45, which in turn is connected to the distributing chamber 41 by another pipe 46. Near one end of this concentrator is a discharge pipe 47 in communication with the interior of this slop boiler, such pipe having a controlling valve 48, the opening and closing of which is governed by the actuation of a float 49.

Referring again to the reservoir or receptacle 14, it will be noticed that the lower portion of the same beneath the heating coil 38, is equipped with a rotary stirrer or agitator 50 mounted on a revoluble shaft 51 rotated by means of intermeshing gears 52, one of which is on a drive shaft 53 supplied with pulleys 54, this shaft being rotated in the usual manner by a belt not shown. This reservoir is also equipped with a thermometer 55, and a standing-glass 56.

The carrying out of my improved process or method by this form and type of apparatus takes place in substantially the following manner. The pump 11 continually feeds the beer or fermented wort or mash, to the beer heater 13 and through the passages 21 thereof to the pipe 15, to the reservoir 14, and from the latter through the pipe 17 to still 16. The heated steam or vapor from the steam boiled slop in the concentrator acts upon the heated beer or fermented mash in the still and drives off the volatile constituents or alcoholic vapor which arises through the pipe 20 to the vapor compartment 19 of the beer heater 13, acting in such compartment to heat the beer pumped through the passages 21. A portion of such vapors, that is the heavier ones, are condensed and flowing back through the pipe 22 to the still, while the lighter vapors or volatile constituents pass through the pipe 24 and are liquefied in the condenser 23, being discharged through the pipe 27, it being understood that condensing water is continually forced through the condenser 23 by means of the pipes 25 and 26. After the fermented wort or beer has passed through the heater 13 and been raised as is usual to a temperature approximating the boiling point, it is retained for some time in the reservoir 14, the dimensions of the reservoir being such as to hold a quantity of beer equivalent to three or four times the hourly capacity of the still, so that the beer is therein subjected to a prolonged heating at a temperature approximating the boiling point by coil 38 and agitated by the mechanical stirrer 30. Such prolonged heating as has been described above develops the formation of compounds particularly pleasing to the taste and smell, and brings about the subsequent distillation of certain higher alcohols and fatty acids essential to the production of a fine flavor.

In practice, where a still having an hourly capacity of 1,000 gallons is employed, I use a preheating reservoir having a capacity of approximately 5,000 gallons in order to insure that all portions of the beer or mash shall remain therein from three to four hours subject to the heating action, although more or less advantageous results are secured if the period of retention in the preheating reservoir be for a somewhat shorter or longer time.

The slop when it reaches the concentrator or boiler 29, after passing through the perforated distributing plate 42, comes in contact with the steam-heating pipes 37, passing over the same in the form of a thin film, the distributing plate in conjunction with the action of the circulating pump 45, causing a constant heavy torrential rain of slop on the pipes, the washing effect of which is to prevent the formation of any incrustation on such pipes thereby maintaining an efficient transmission of heat from the pipes to the slop and preventing the development of an objectionable taste or smell in the distillate, due to an over-heated or burnt crust. The discharge of the concentrated slop is controlled by the float 49, the movement of which is necessarily governed by the amount of slop accumulated in the bottom of the concentrator, but under ordinary working conditions the discharge of slop would be substantially continuous and uniform. The chamber 28 is connected through the pipe 57 with a pressure gage 58, which shows the pressure prevailing in the column, and a slop tester 59 which shows whether the vapor coming from the slop boiler 28 is free of alcohol. This pressure gage and slop tester are of known construction, and do not form part of my present invention. It should be understood therefore that in this process and in the operation of this apparatus the fermented wort or beer is heated by the action of the hot volatile constituents of the mash delivered from the still, and that the beer is subsequently subjected to an extended or prolonged heating and agitation in the reservoir 14, in time passing to the still and having its volatile constituents or alcoholic vapors driven off by the action of the steam or vapor from the boiling slop in the concentrator, its volatile constituents in turn heating another portion of the continuously pumped or conveyed beer. The action of the steam heated concentrator is continuous and it operates in such a manner that the heated surfaces are maintained substantially clean and free from incrustation. The condensed steam of such concentrator in turn being used to heat the beer or fermented mash in the reservoir. Clearly then this process is carried out and this apparatus is operated at a maximum of economy with a resulting finely flavored alcoholic or spirituous liquor and the slop concentrated to a higher degree than has heretofore been accomplished.

The invention is not limited to this particular apparatus because the benefits and advantages hereinabove mentioned may be secured by employing other devices of somewhat similar construction and various modifications in the process which may be used without departure from the heart or essence of the invention. While I have herein shown the use of the condensed steam from the slop boiler or concentrator for heating the beer or fermented mash in the reservoir 14, I wish to have it understood that the hot spent slop may, if desired, be used for the same purpose instead of the condensed steam and in place of the same any other suitable heating medium might be employed.

I claim:

1. The method of distilling, which consists in subjecting the fermented mash in a body to a prolonged heating to develop the flavor and then distilling from said mash its volatile constituents by means of a vapor developed by the concentration of the slop, such vapor being substantially free from objectionable qualities which would tend to injure the developed flavor, substantially as described.

2. The method of distilling, which consists in preliminarily heating the fermented mash, then continuously subjecting the heated mash to a further prolonged heating to develop the flavor, then continuously distilling the volatile constituents of the mash by means of a vapor which is substantially free from objectionable qualities which would tend to injure the developed flavor, substantially as described.

3. The method of distilling, which consists in heating the fermented mash, then continuously subjecting the heated mash to a simultaneous agitation and prolonged heating to develop the flavor, and then continuously distilling the volatile constituents of the mash by means of a vapor developed by the concentration of the slop, such vapor being substantially free from objectionable qualities which would tend to injure the developed flavor, substantially as described.

4. The method of distilling, which consists in heating the fermented mash, then subjecting the heated mash to a prolonged heating to develop the flavor, and then distilling the volatile constituents of the mash by means of a vapor developed by the concentration of the slop, such vapor being substantially free from objectionable qualities which would tend to injure the developed flavor, said first heating of the mash being brought about by the heated volatile constituents of the mash during their distillation, substantially as described.

5. The method of distilling, which consists in heating the fermented mash, then subjecting the heated mash to a prolonged heating to develop the flavor, then distilling the volatile constituents of the mash, and then boiling the resulting slop to effect its concentration and produce a vapor employed for the production of said distillation, such vapor being substantially free from objectionable qualities which would tend to injure the developed flavor, said prolonged heating of the mash being occasioned by the action thereon of a heated product of the slop-boiling operation, substantially as described.

6. The method of distilling, which consists in heating the fermented mash, then subjecting the heated mash to a prolonged heating to develop the flavor, then distilling the volatile constituents of the mash, and then boiling the resulting slop by steam to effect the concentration of the slop and produce a vapor for the production of the distillation, said vapor being substantially free from objectionable qualities which would tend to injure the developed flavor, the condensed steam of said slop-boiling operation being used to cause said prolonged heating of the mash, substantially as described.

7. The method of distilling, which consists in heating the fermented mash, then subjecting the heated mash to a simultaneous agitation and prolonged heating to develop the flavor, then distilling the volatile constituents of the mash, and then boiling the resulting slop to effect its concentration and to produce a vapor for the production of said distillation, said vapor being substantially free from objectionable qualities which would tend to injure the developed flavor, said first heating of the mash being brought about by the heated volatile constituents of the mash during their distillation, said prolonged heating of the mash being occasioned by the action thereon of a heated product of the slop-boiling operation, substantially as described.

8. The method of distilling, which consists in heating the fermented mash, then subjecting the heated mash to a simultaneous agitation and prolonged heating to develop the flavor, then distilling the volatile constituents of the mash, and then boiling the resulting slop by means of steam to effect its concentration and to produce a vapor for the production of said distillation, such vapor being substantially free from objectionable qualities which would tend to injure the developed flavor, said first heating of the mash being brought about by the heated volatile constituents of the mash during their distillation, the condensed steam resulting from the slop-boiling operation being used to occasion said prolonged heating of the mash, substantially as described.

9. The method of distilling, which consists in causing the fermented mash to traverse a heated reservoir having a capacity in excess of the capacity of the still, whereby to detain and subject the same to a prolonged heating to develop the flavor, and then distilling from such mash its volatile constituents, substantially as described.

10. The method of distilling, which consists in causing the fermented mash to traverse a heated reservoir having a capacity three to five times that of the capacity of the still, whereby to detain and subject the same therein to a prolonged heating to develop the flavor and then distilling from such mash its volatile constituents, substantially as described.

11. The method of distilling, which consists in heating the fermented mash by the vapors from the still, then detaining the heated mash in a heated reservoir having a capacity in excess of the capacity of the still, whereby to detain and subject the same to a further prolonged heating to develop the flavor, then continuously distilling the volatile constituents of the mash by means of a vapor which is substantially free from objectionable qualities which would tend to injure the developed flavor, substantially as described.

12. The method of distilling, which consists in heating the fermented mash by the vapors from the still, then detaining the heated mash in a heated reservoir having a capacity three to five times that of the still, whereby to detain and subject the same to a further prolonged heating to develop the flavor, and then continuously distilling the volatile constituents of the mash by means of a vapor which is substantially free from objectionable qualities which would tend to injure the developed flavor, substantially as described.

ADOLPH WOOLNER, Jr.

Witnesses:
WILLIAM BOURKE,
ROBT. C. RYAN.